April 29, 1958     H. F. BRINKER ET AL     2,832,238
METHOD OF MAKING A CORE DRILL AND THE LIKE
Original Filed Sept. 29, 1950
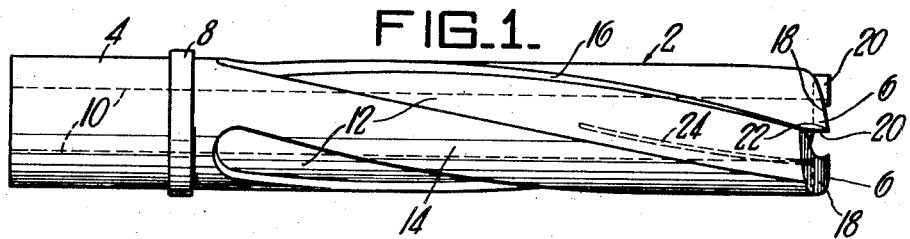
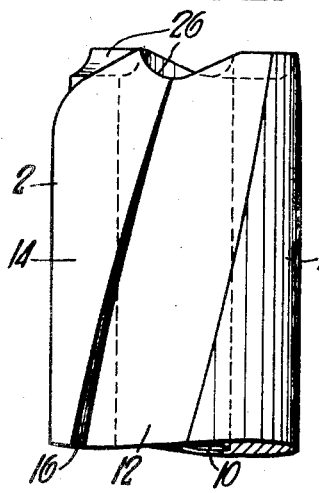
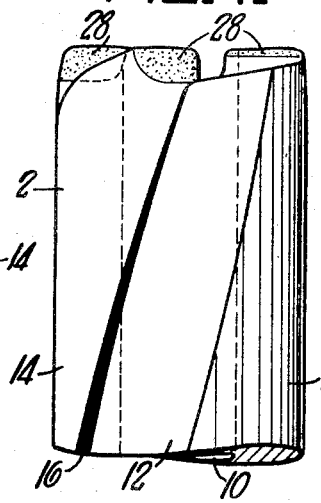
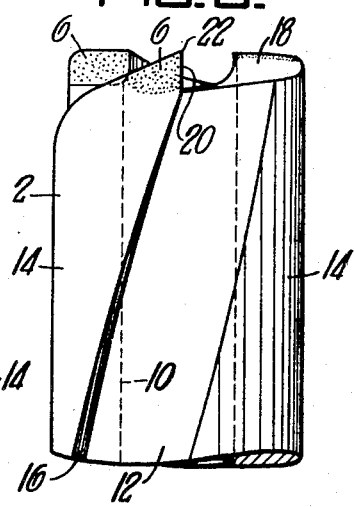
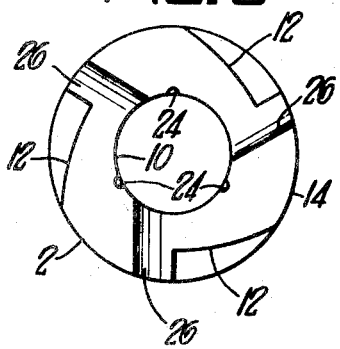
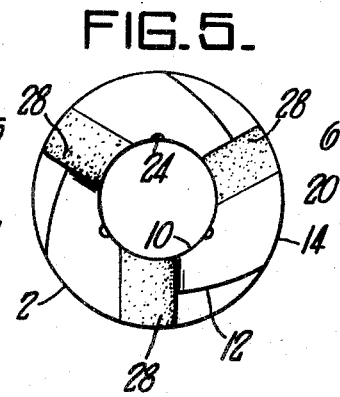
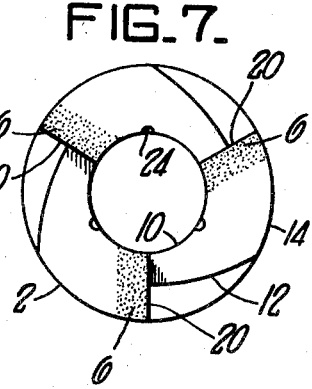
*Inventors:*
HARRY F. BRINKER and
WILLIAM J. FLYNN,
by: Donald G. Dalton
                                            their Attorney

United States Patent Office 2,832,238
Patented Apr. 29, 1958

2,832,238

METHOD OF MAKING A CORE DRILL AND THE LIKE

Harry F. Brinker, Whitaker, and William J. Flynn, Braddock, Pa.

Original application September 29, 1950, Serial No. 187,526. Divided and this application September 2, 1953, Serial No. 378,118

2 Claims. (Cl. 76—108)

This application, which is a division of our copending application Serial No. 187,526, filed September 29, 1950, and now abandoned, relates to a method of making a core drill and the like and more particularly to a method of making a core drill which is especially suitable for removing an elongated cylindrical portion from a solid body of metal by cutting an annular groove around such cylindrical portion.

Prior to our invention, many methods of making core drills of various designs and compositions of material have been proposed. While core drills made according to prior art methods have been effected to a degree, they have not been entirely satisfactory particularly when it was sought to cut long cores out of hard material, such as water-hardened armor plate steel. When subjected to such difficult use, the cutting bits of the drills, which were usually made of hard and brittle material, such as tungsten carbide, would tend to shatter and spall.

It is, accordingly, a primary object of our invention to provide a method of making a core drill of improved composition of material having a design which adapts it to the drilling of hard material.

Another object of our invention is to provide a method of making a core drill wherein metal cutting bits are deposited and fused on a helically fluted body of steel and annealed.

These and other objects will become more apparent after referring to the following specification and attached drawing, in which:

Figure 1 is a plan view of the finished drill;

Figure 2 is a side elevational view showing the drill during the first stage of processing;

Figure 3 is a top plan view of Figure 2;

Figure 4 is a view similar to Figure 2 showing the drill during the second stage of processing;

Figure 5 is a top plan view of Figure 4;

Figure 6 is a side elevational view of the finished drill; and

Figure 7 is a top plan view of Figure 6.

Referring more particularly to the drawing, reference numeral 2 indicates an elongated cylindrical or tubular body having a shank 4 at one end and a plurality of circumferentially spaced cutting bits 6 at the other end. Shank 4 and the cutting bits 6 are integral with the body 2. A shoulder 8 surrounds the tubular body at the bottom of the shank 4 and a center bore 10 extends coaxially through the shank and through the tubular body. The outer periphery of the body 2 is provided with three helical external flutes 12 which extend away from the cutting end of the tool with spaced lands 14 therebetween. Each of the flutes 12 has two walls 16. At one end, the lands 14 are ground to terminate in a helical surface 18 on the cutting end of the tool. The cutting bits 6, which are made of electrically deposited and fused high-speed steel which will be described more fully hereinafter, are integral with the body 2 and are formed by the intersections of helical surfaces 18 with the walls 16 of the flutes. The bit surfaces 20 that are formed by the walls 16 lie substantially in the same plane as the axis of the tubular body 2. The cutting edges 22, which are formed by the intersections of the helical surfaces 18 and the bit surfaces 20, are normal to the axis of the tubular body 2. Thus, the cutting bits 6 have neither axial nor radial rake. The total elimination of rake as practiced in the present invention is contrary to the teachings of the prior art wherein it was universally taught that a positive or negative rake was an essential prerequisite in the manufacture of a core drill.

Three longitudinal grooves 24 may be spaced around the inner surface of the bore 10 for supplying coolant fluid to the cutting end of the tubular body.

The body 2 with shank portion 4 of the present invention is machined preferably of a low-carbon steel, such as SAE 1020 fine-grained steel, to the shape shown in Figures 2 and 3; carburized at 900° C. for 24 hours; oil-quenched to room temperature; heated to 780° C. in 25 to 30 minutes after which approximately one inch of the cutting end is water quenched to room temperature; the piece is then drawn at 180 to 200° C. for one hour.

The cutting bits 6 are then formed by the grinding of seats 26 in the end of the cylindrical body 2 and filling them with a high-speed steel 28 deposited by the conventional arc welding process or other process which produces a similar result of melt welding of the high-speed steel. It has been found preferable, for the arc welding process, to use coated electrodes composed of steel containing substantially 18% tungsten, 4% chromium, 1% vanadium, and other alloying elements common to this grade of steel. The conventional arc welding process has been found satisfactory. Metal deposition by means of an electric arc is preferable although deposition of the metal may be accomplished by means of a gas weld if desired. After the high-speed steel has been electrically or gas weld deposited, it is heated by means of an oxyacetylene torch or the like to incipient fusion, which is manifest in a smoothing of the original deposited metal, and cooled in still air. Omission of this fusion treatment causes a coarse grain structure which results in the development of an undesirable hardness distribution throughout the cross-section of the bits and resultant destruction of the bits after a relatively short use. The final step consists of grinding the tool to the shape shown in Figures 6 and 7.

Core drills made according to the present invention exhibit an exceptional resistance to wear in the drilling of hardened materials, such as armor plate steel, and possess excellent cutting properties.

While one embodiment of our invention has been shown and described, it will be apparent that other adaptations and modifications may be made without departing from the scope of the following claims.

We claim:

1. In a method of forming cutting bits on a metal tool the steps including removing stock from a portion of said tool to form cutting bit seats, then depositing high-speed steel directly on said seats by melt welding of said steel, and then, after solidification of the welded high-speed steel, reheating said welded high-speed steel substantially to fusion temperature.

2. In a method of forming cutting bits on a core drill having a cutting end, and a body formed with a plurality of helical external flutes with lands therebetween extending away from said cutting end, the steps including removing stock from the lands adjacent said cutting end to form cutting bit seats, then depositing high-speed steel directly on said seats by melt welding of said steel, and then, after solidification of said welded high-speed steel, reheating the welded high-speed steel substantially to fusion temperature.

References Cited in the file of this patent

UNITED STATES PATENTS

| | | |
|---|---|---|
| 1,803,875 | Stoody | May 5, 1931 |
| 1,855,330 | Zublin | Apr. 26, 1932 |
| 2,524,570 | Phipps | Oct. 3, 1950 |

FOREIGN PATENTS

| | | |
|---|---|---|
| 625,459 | France | Apr. 23, 1950 |

U. S. DEPARTMENT OF COMMERCE
PATENT OFFICE

CERTIFICATE OF CORRECTION

Patent No. 2,832,238    Harry F. Brinker et al.    April 29, 1958

It is hereby certified that error appears in the printed specification of the above numbered patent requiring correction and that the said Letters Patent should read as corrected below.

Column 1, line 26, for "effected" read --effective--.

Signed and sealed this 1st day of July 1958.

(SEAL)
Attest:
KARL H. AXLINE

Attesting Officer

ROBERT C. WATSON
Commissioner of Patents